(12) United States Patent (10) Patent No.: US 7,959,826 B2
Gallagher et al. (45) Date of Patent: Jun. 14, 2011

(54) METHODS OF PREVENTING FROST FORMATION AND FACILITATING THE REMOVAL OF WINTER PRECIPITATION RELATIVE TO A WINDSHIELD AND COMPOSITIONS FOR USE THEREIN

(75) Inventors: Laurie A. Gallagher, New Milford, CT (US); Rebecca A. Marshall, Wallingford, CT (US); Mark V. Alexander, Bridgewater, CT (US)

(73) Assignee: Honeywell International Inc., Morristown, NJ (US)

( * ) Notice: Subject to any disclaimer, the term of this patent is extended or adjusted under 35 U.S.C. 154(b) by 117 days.

(21) Appl. No.: 11/203,822

(22) Filed: Aug. 15, 2005

(65) Prior Publication Data

US 2006/0036053 A1 Feb. 16, 2006

Related U.S. Application Data

(60) Provisional application No. 60/601,804, filed on Aug. 16, 2004.

(51) Int. Cl.
*C09K 3/18* (2006.01)
*B32B 9/04* (2006.01)

(52) U.S. Cl. ....... 252/70; 428/447; 106/13; 106/287.13; 106/287.11

(58) Field of Classification Search ............ 252/70; 523/169; 428/447; 106/13, 287.13, 287.11
See application file for complete search history.

(56) References Cited

U.S. PATENT DOCUMENTS

| | | | | |
|---|---|---|---|---|
| 2,612,458 A | | 9/1952 | Stedman | 117/92 |
| 2,923,633 A | | 2/1960 | Stedman | 106/13 |
| 2,962,390 A | | 11/1960 | Fain et al. | 117/64 |
| 3,337,351 A | * | 8/1967 | Morehouse | 106/13 |
| 3,433,750 A | | 3/1969 | Fain et al. | 260/2 |
| 3,460,981 A | | 8/1969 | Keil et al. | 117/135.1 |
| 3,579,540 A | * | 5/1971 | Ohlhausen | 523/169 |
| 3,881,043 A | * | 4/1975 | Rieser et al. | 428/81 |
| 3,986,997 A | * | 10/1976 | Clark | 524/300 |
| 4,006,271 A | * | 2/1977 | French et al. | 427/164 |
| 4,469,743 A | * | 9/1984 | Hiss | 428/215 |
| 4,671,990 A | * | 6/1987 | Jada et al. | 442/136 |
| 4,837,261 A | * | 6/1989 | Hampe et al. | 524/268 |
| 4,842,766 A | * | 6/1989 | Blehm et al. | 516/23 |
| 4,877,654 A | * | 10/1989 | Wilson | 427/387 |
| 4,954,279 A | * | 9/1990 | Ma et al. | 252/70 |
| 5,091,009 A | * | 2/1992 | Nogami et al. | 106/287.1 |
| 5,136,068 A | * | 8/1992 | Bahr et al. | 516/20 |
| 5,188,750 A | | 2/1993 | Kogure et al. | 252/70 |
| 5,342,534 A | * | 8/1994 | Skrobala et al. | 15/104.93 |
| 5,531,814 A | * | 7/1996 | Bahr et al. | 106/3 |
| 5,584,917 A | * | 12/1996 | Kijima et al. | 106/2 |
| 5,629,006 A | * | 5/1997 | Hoang et al. | 424/405 |
| 5,736,425 A | * | 4/1998 | Smith et al. | 438/778 |
| 5,741,844 A | * | 4/1998 | Nass et al. | 524/523 |
| 5,843,330 A | | 12/1998 | Barbour et al. | 252/70 |
| 5,889,086 A | * | 3/1999 | Ushijima et al. | 523/169 |
| 6,013,323 A | * | 1/2000 | Klayder et al. | 427/384 |
| 6,086,664 A | * | 7/2000 | Blohowiak et al. | 106/287.16 |
| 6,162,547 A | * | 12/2000 | van Ooji et al. | 428/447 |
| 6,169,066 B1 | | 1/2001 | Gasmena | 510/466 |
| 6,228,150 B1 | * | 5/2001 | Armstrong et al. | 95/139 |
| 6,235,383 B1 | * | 5/2001 | Hong et al. | 428/331 |
| 6,261,357 B1 | * | 7/2001 | Egami et al. | 106/287.1 |
| 6,261,638 B1 | * | 7/2001 | van Ooij et al. | 427/379 |
| 6,291,022 B1 | * | 9/2001 | Hong et al. | 427/389.7 |
| 6,309,425 B1 | * | 10/2001 | Murphy | 8/142 |
| 6,337,129 B1 | * | 1/2002 | Watanabe et al. | 428/328 |
| 6,461,537 B1 | * | 10/2002 | Turcotte et al. | 252/194 |
| 6,509,101 B2 | * | 1/2003 | Fairbourn | 428/447 |
| 6,540,745 B1 | * | 4/2003 | Fairbourn et al. | 606/45 |
| 6,590,023 B2 | * | 7/2003 | MacMillan | 524/495 |
| 6,596,060 B1 | * | 7/2003 | Michaud | 106/2 |

(Continued)

FOREIGN PATENT DOCUMENTS

EP 0 903 389 A1 3/1999

(Continued)

OTHER PUBLICATIONS http://microscopy.berkeley.edu/Resources/instruction/buffers.html, 8 pages, 1999.*

*Primary Examiner* — Randy Gulakowski
*Assistant Examiner* — Robert Loewe
(74) *Attorney, Agent, or Firm* — Cantor Colburn LLP

(57) ABSTRACT

Disclosed is a method of preventing frost and facilitating removal of winter precipitation relative to a windshield, comprising applying to a windshield a winter precipitation barrier composition. In one embodiment, the barrier composition comprises: a solvent and a silicon containing compound, the silicon containing compound comprising at least one of a reactive silane, a polyalkylene oxide polysiloxane, or a combination of at least one of the foregoing, wherein the reactive silane is at least one of a halosilane having the formula $$X_n SiR_{4-n}^1 \qquad (I);$$

an alkoxysilane or aminosilane having the formula

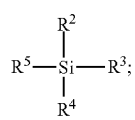 (II)

a compound of formula $$(R^6)_3Si\!-\!R^7\!-\!Si(R^8)_3 \qquad (III);$$

or a combination comprising one or more of the foregoing reactive silanes. In another embodiment, the disclosed winter precipitation barrier composition comprises a reactive silane and a solvent, wherein the reactive silane is as described above.

9 Claims, No Drawings

U.S. PATENT DOCUMENTS

| | | | |
|---|---|---|---|
| 6,639,015 B1* | 10/2003 | Nakashima et al. | 525/106 |
| 6,695,904 B2* | 2/2004 | Burger et al. | 106/287.14 |
| 6,723,689 B1* | 4/2004 | Hoang et al. | 510/130 |
| 6,785,989 B2* | 9/2004 | Rienzo et al. | 38/77.1 |
| 6,800,574 B2* | 10/2004 | Anderson | 501/33 |
| 6,809,072 B2* | 10/2004 | Abidh et al. | 510/180 |
| 6,893,726 B2* | 5/2005 | Nakashima et al. | 428/447 |
| 2001/0002042 A1* | 5/2001 | Avery | 252/182.11 |
| 2001/0031364 A1 | 10/2001 | Ogawa et al. | 428/428 |
| 2002/0010272 A1 | 1/2002 | Mahdi et al. | 525/100 |
| 2002/0122962 A1* | 9/2002 | Arfsten et al. | 428/697 |
| 2003/0110976 A1 | 6/2003 | Abidh et al. | 106/2 |
| 2004/0050297 A1* | 3/2004 | Kobayashi et al. | 106/287.14 |
| 2004/0097398 A1* | 5/2004 | Heltovics et al. | 512/3 |
| 2004/0110660 A1 | 6/2004 | Lentsch et al. | 510/521 |
| 2004/0123772 A1* | 7/2004 | Zimmer et al. | 106/31.27 |
| 2004/0202872 A1* | 10/2004 | Fang et al. | 428/447 |
| 2004/0241132 A1* | 12/2004 | Majlessi et al. | 424/74 |
| 2005/0070629 A1* | 3/2005 | Roberts | 523/160 |
| 2005/0117276 A1* | 6/2005 | Liu et al. | 361/504 |
| 2005/0183629 A1* | 8/2005 | McCain et al. | 106/31.27 |
| 2005/0215663 A1* | 9/2005 | Berge et al. | 523/160 |
| 2005/0282928 A1* | 12/2005 | Lin et al. | 523/160 |
| 2007/0275867 A1* | 11/2007 | Serobian | 510/466 |

FOREIGN PATENT DOCUMENTS

| | | |
|---|---|---|
| EP | 1688469 A1 | 8/2006 |
| WO | 2004009505 A1 | 1/2004 |

* cited by examiner

METHODS OF PREVENTING FROST FORMATION AND FACILITATING THE REMOVAL OF WINTER PRECIPITATION RELATIVE TO A WINDSHIELD AND COMPOSITIONS FOR USE THEREIN

CROSS REFERENCE TO RELATED APPLICATIONS

This application claims the benefit of U.S. Provisional Application Ser. No. 60/601,804, filed on Aug. 16, 2004.

BACKGROUND

Typical windshield washer/deicer compositions have the property of melting ice that forms on windshields. Windshield washer/deicer fluids generally contain water, a water miscible alcohol to depress the freezing point, a surfactant for lubricating, and a colorant. Many deicer or anti-icing compositions rely upon an alcohol, in particular methanol, to impart the ice-melting properties to the compositions.

However, the primary purpose of such compositions is to assist the windshield wipers in the removal of vision obscuring materials from a windshield. Vision obscuring materials include dirt, grime, bugs, sap, frost, ice, snow and combinations thereof. Although these compositions can be used to assist in the removal of accumulated frost, ice and/or snow, they have typically failed to prevent or impede the formation of frost. Moreover, none of these compositions are known to provide the dual function of preventing frost formation while still making it easier to remove any frost, snow and/or ice that has accumulated.

'Frost' as used herein refers to the deposit of minute ice crystals formed from the condensation of water vapor at a temperature below freezing. It will be appreciated that frost is often seen on the windshields and windows of an automobile exposed to temperatures at or below freezing. Although frost can develop within a few hours or less, drivers often experience it in the morning.

Frost is undesirable because it can result in increased driver delay and/or the wasteful application of heat energy. Frost is often adhered to a window surface so strongly and in such amounts that forceful mechanical action and/or the extended application of heat is necessary for its removal. Drivers would thus prefer to be met with frost-free windows, windows having greatly reduced amounts of frost thereon, and/or frost that is more easily removed, i.e., less adhered to the windshield.

The term 'winter precipitation' as used herein refers to frost, snow, ice, and mixtures thereof. It will be appreciated that in some cases, frost formation is accompanied by the accumulation of snow, ice, and mixtures thereof. In all cases, it would be desirable for drivers to find it easier to remove any accumulated winter precipitation from an automotive windshield or window. Windshield as used herein refers to any glass panel that a vehicle driver or passenger looks through or at or which light is desired to pass through, such as an exterior automotive lighting and mirrors.

Drivers thus particularly desire a method whereby the accumulation of frost on a windshield could be either entirely prevented or greatly reduced while simultaneously making it easier to removal any accumulated winter precipitation. The terms 'prevent' or 'impede' as used herein refer to the reductions in the area, thickness, hardness, and/or degree of adhesion of any accumulated winter precipitation. It will be appreciated that reductions in the degree of adhesion of any accumulated winter precipitation to a windshield facilitate the removal of such winter precipitation from said windshield. That is, it becomes easier to scrape, rinse, wipe, and/or brush the winter precipitation from the windshield.

Compositions comprising alkyl-substituted disilicanes and alkoxy-substituted di- and tri-silicanes have been described as useful as water-repellent compositions for use on windshields. Mono-alkoxy silicanes have been described as useful as a bonding composition for use with water-repellent compositions comprising a hydrocarbon wax and a polyamide. No water-repellency is attributed to the silanes themselves. Finally, particular silicane copolymers are described as useful for providing water-repellency, as well as facilitating ice removal from windshields.

Thus, there continues to be a need for compositions and methods for preventing the formation of frost while simultaneously making it easier to remove any accumulated winter precipitation from a windshield, especially in regards to the prevention of frost over a period of hours, such as overnight.

SUMMARY

In one embodiment, a winter precipitation barrier composition is disclosed that comprises a reactive silane and a solvent, wherein the reactive silane is at least one of a halosilane having the formula $$X_n SiR_{4-n}^1 \quad (I)$$

wherein n is a number from 1 to 3, $R^1$ is a linear, branched or cyclic, substituted or unsubstituted $C_1$-$C_{30}$ alkyl, $C_2$-$C_{30}$ alkenyl, or $C_6$-$C_{36}$ aryl, alkaryl, or aralkyl group, and X is F, Cl, Br, or I; an alkoxysilane or aminosilane having the formula

(II)

wherein the alkoxysilane or aminosilane comprises no Si—Si bonds; each $R^2$-$R^5$ may be the same or different; at least two of $R^2$-$R^5$ are of the formula $OR^6$ or $NR^7R^8$; the remaining $R^2$-$R^5$ are independently linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl groups that may optionally comprise heteroatoms that are not silicon; $R^6$ may be a linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl groups that may optionally comprise heteroatoms that are not silicon; and $R^7$ and $R^8$ may be the same or different and may be hydrogen or a linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl groups that may optionally comprise heteroatoms that are not silicon; a compound of formula $$(R^6)_3 Si-R^7-Si(R^8)_3 \quad (III)$$

wherein $R^6$ and $R^8$ are independently halogen or linear, branched or cyclic, substituted or unsubstituted, $C_1$-$C_{30}$ alkoxy groups and $R^7$ is a linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl group that may optionally comprise heteroatoms that are not silicon; or a combination comprising one or more of the foregoing reactive silanes.

In another embodiment, the disclosed winter precipitation barrier composition comprises a silicon containing compound consisting of a polyalkylene oxide polysiloxane; a solvent, and optionally, an auxiliary compound, a humectant, or a combination comprising one or more of the foregoing compounds.

Also disclosed are methods of preventing frost and removing winter precipitation relative to a windshield comprising applying the disclosed winter precipitation barrier compositions on a windshield.

In yet another embodiment, the disclosed method of preventing frost and removing winter precipitation relative to a windshield, comprises applying to a windshield a winter precipitation barrier composition comprising: a solvent and a silicon containing compound, the silicon containing compound comprising at least one of a reactive silane, a polyalkylene oxide polysiloxane, or a combination of at least one of the foregoing, wherein the reactive silane is at least one of a halosilane having the formula $$X_nSiR_{4-n}^1 \qquad (I)$$

wherein n is a number from 1 to 3, $R^1$ is a linear, branched or cyclic, substituted or unsubstituted $C_1$-$C_{30}$ alkyl, $C_2$-$C_{30}$ alkenyl, or $C_6$-$C_{36}$ aryl, alkaryl, or aralkyl group, and X is F, Cl, Br, or I; an alkoxysilane or aminosilane having the formula

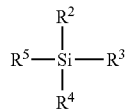

(II)

wherein the alkoxysilane or aminosilane comprises no Si—Si bonds; each $R^2$-$R^5$ may be the same or different; at least two of $R^2$-$R^5$ are of the formula $OR^6$ or $NR^7R^8$; the remaining $R^2$-$R^5$ are independently linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl groups that may optionally comprise heteroatoms that are not silicon; $R^6$ may be a linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl groups that may optionally comprise heteroatoms that are not silicon; and $R^7$ and $R^8$ may be the same or different and may be hydrogen or a linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl groups that may optionally comprise heteroatoms that are not silicon; a compound of formula $$(6)_3Si-R^7-Si(R^8)_3 \qquad (III)$$

wherein $R^6$ and R are independently halogen or linear, branched or cyclic, substituted or unsubstituted, $C_1$-$C_{30}$ alkoxy groups and $R^7$ is a linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl group that may optionally comprise heteroatoms that are not silicon; or a combination comprising one or more of the foregoing reactive silanes.

The above-described and other features will be appreciated and understood by those skilled in the art from the following detailed description, and appended claims.

DETAILED DESCRIPTION

Described herein are winter precipitation barrier compositions. It will be appreciated that in some cases, a winter precipitation barrier composition will entirely prevent the formation of frost on a windshield while in other cases, a winter precipitation barrier composition will reduce the amount of frost on a windshield with regards to at least one of area, thickness or hardness relative to an untreated windshield.

In addition, it has also been found that the winter precipitation barrier compositions facilitate the removal of any accumulated winter precipitation. That is, it has unexpectedly been found that the use of the winter precipitation barrier compositions makes it easier to remove any frost that might have formed as well as any snow and/or ice that may also have accumulated. Those of skill in the art will appreciate that frost formation and winter precipitation accumulation is dependent upon a number of external variables such as humidity, temperature, wind, and/or time of exposure.

In one embodiment, the disclosed winter precipitation barrier compositions comprise a silicon-containing compound and a solvent. In another embodiment, the disclosed winter precipitation barrier compositions comprise a silicon compound, a solvent, and at least one of an auxiliary compound, a humectant, dyes, colorants, and combinations thereof. In one exemplary embodiment, the disclosed winter precipitation barrier compositions comprise a silicon compound, a solvent, an auxiliary compound and a humectant.

Also disclosed is a method of treating a windshield comprising applying the disclosed winter precipitation barrier compositions on a windshield to simultaneously prevent frost formation and facilitate the removal of winter precipitation.

In one embodiment, the silicon-containing compound or silicon compound will comprise at least one of a reactive silane, a polyalkylene oxide polysiloxane or a combination of at least one of the foregoing. In one exemplary embodiment, the disclosed winter precipitation barrier compositions will comprise a silicon compound that consists of one or more reactive silanes as discussed below.

The term 'reactive silane' as used herein refers to a molecule containing a silicon atom attached to a hydrolysable leaving group silanes, i.e., molecules in which one O—Si or X—Si (X=halogen) bond may be broken when the compound is placed in contact with glass. In one embodiment, suitable reactive silanes for use herein will be at least one of a halosilane, an alkoxysilane, aminosilane, a bridged bis-silane, or a combination comprising one or more of the foregoing reactive silanes. In one exemplary embodiment, the silicon compound will consist of an alkoxysilane as defined below.

In one embodiment, the silicon compound useful in the disclosed winter precipitation barrier compositions will be a halosilane. Suitable halosilanes include compounds of formula I $$X_nSiR_{4-n}^1 \qquad (I)$$

wherein n is a number of from 1 to 3, $R^1$ is a linear, branched or cyclic, substituted or unsubstituted $C_1$-$C_{30}$ alkyl, $C_2$-$C_{30}$ alkenyl, or $C_6$-$C_{36}$ aryl, alkaryl, or aralkyl group; and X is F, Cl, Br, or I. In one embodiment, X is Cl and n is 1 while in another embodiment X is Cl and n is 3.

If n is 3, the halosilane is a trihalosilane. In one embodiment, the trihalosilane is a trichlorosilane. Exemplary trichlorosilanes include methyltrichlorosilane, ethyltrichlorosilane, propyltrichlorosilane, n-butyltrichlorosilane, cyclohexyltrichlorosilane, n-octadecyltrichlorosilane, phenyltrichlorosilane, and combinations comprising one or more of the foregoing trichlorosilanes.

In another embodiment, the silicon compound suitable for use in the disclosed winter precipitation barrier compositions will be an alkoxysilane or aminosilane. In one embodiment, the alkoxysilane or aminosilane will be of the general formula II

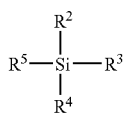 (II)

wherein at least two of R²-R⁵ are of the formula OR⁶ or NR⁷R⁸; and the remaining R²-R⁵ are independently linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl groups that optionally may comprise heteroatoms other than silicon; and wherein the reactive silane comprises no Si—Si bonds. Each R²-R⁵ may be the same or different. In this formula, R⁶ may be a linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl groups that optionally may optionally comprise heteroatoms other than silicon. R⁷ and R⁸ may be the same or different and may be hydrogen or a linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl groups that may optionally comprise heteroatoms other than silicon. In one exemplary embodiment, at least three of the R²-R⁵ groups will be of the formula OR⁶ or NR⁷R⁸. In another exemplary embodiment, at least three of the R²-R⁵ groups will be of the formula OR⁶.

In another embodiment, R⁶ will be a linear, branched, or cyclic, substituted or unsubstituted $C_1$-$C_{30}$ alkyl that does not comprise any heteroatoms. In another embodiment, R⁶ will be a linear unsubstituted $C_1$-$C_{10}$ alkyl that does not comprise any heteroatoms. In one particularly exemplary embodiment, R⁶ will be a methyl group.

In one embodiment, R⁷ and R⁸ may be the same or different and may be hydrogen or a linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl groups and may or may not comprise heteroatoms other than silicon.

In another embodiment, the remaining R²-R groups that are not of the formula OR⁶ or NR⁷R⁸ are independently linear branched, or cyclic, substituted or unsubstituted $C_1$-$C_{30}$ alkyl groups that do not comprise heteroatoms other than silicon. In another embodiment, the remaining R²-R⁵ groups will be linear, unsubstituted $C_1$-$C_{10}$ alkyl groups that do not comprise any heteroatoms. In one particularly exemplary embodiment, the remaining R²-R⁵ groups will be a methyl group.

As used herein, "alkyl" is intended to include both branched and straight-chain saturated aliphatic hydrocarbon groups, having the specified number of carbon atoms. Thus, the term $C_1$-$C_6$ alkyl as used herein includes alkyl groups having from 1 to 6 carbon atoms. When $C_0$-$C_n$ alkyl is used herein in conjunction with another group, for example, (phenyl)$C_0$-$C_4$ alkyl, the indicated group, in this case phenyl, is either directly bound by a single covalent bond ($C_0$), or attached by an alkyl chain having the specified number of carbon atoms, in this case from 1 to about 4 carbon atoms. Examples of alkyl include, but are not limited to, methyl, ethyl, n-propyl, isopropyl, n-butyl, t-butyl, n-pentyl, and sec-pentyl.

"Alkenyl" as used herein, indicates a hydrocarbon chain of either a straight or branched configuration having one or more carbon-carbon double bonds, which may occur at any stable point along the chain. Examples of alkenyl groups include ethenyl and propenyl.

"Alkoxy" represents an alkyl group as defined above with the indicated number of carbon atoms attached through an oxygen bridge. Examples of alkoxy include, but are not limited to, methoxy, ethoxy, n-propoxy, i-propoxy, n-butoxy, 2-butoxy, t-butoxy, n-pentoxy, 2-pentoxy, 3-pentoxy, isopentoxy, neopentoxy, n-hexoxy, 2-hexoxy, 3-hexoxy, and 3-methylpentoxy.

As used herein, the term "aryl" indicates aromatic groups containing only carbon in the aromatic ring or rings. Typical aryl groups contain 1 to 3 separate, fused, or pendant rings and from 6 to about 18 ring atoms, without heteroatoms as ring members. When indicated, such aryl groups may be further substituted with carbon or non-carbon atoms or groups. Such substitution may include fusion to a 5 to 7-membered saturated cyclic group that optionally contains 1 or 2 heteroatoms independently chosen from N, O, and S, to form, for example, a 3,4-methylenedioxy-phenyl group. Aryl groups include, for example, phenyl, naphthyl, including 1-naphthyl and 2-naphthyl, and bi-phenyl.

In the term "aralkyl", aryl and alkyl are as defined above, and the point of attachment is on the alkyl group. This term encompasses, but is not limited to, benzyl, phenylethyl, and piperonyl.

Illustrative examples of suitable alkoxysilanes for use in the winter precipitation barrier compositions include, for example, n-octadecyltrimethoxysilane, phenyltrimethoxysilane, octyltriethoxysilane, methyltrimethoxysilane, vinyltrimethoxysilane, gamma-methylacryloxypropyltrimethoxysilane, gamma-glycidoxypropyltrimethoxysilane, methyl triethoxysilane, isopropyltrimethoxysilane, isopropyltriethoxysilane, n-propyltrimethoxysilane, n-propyl triethoxysilane, and combinations comprising one or more of the foregoing alkoxysilanes. In one exemplary embodiment, the silicon compound suitable for use in the disclosed winter precipitation barrier compositions will be methyltrimethoxysilane. In another embodiment, the silicon compound suitable for use in the disclosed winter precipitation barrier compositions will be a bridged bis-silane of formula III

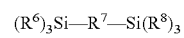 (III)

wherein R⁶ and R⁸ are independently halogen or linear, branched or cyclic, substituted or unsubstituted, $C_1$-$C_{30}$ alkoxy groups, and R⁷ is a linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl group. Each R⁶ and R⁸ may be the same or different.

A suitable compound of formula III is an ethylene bridged bis-(triethoxy) silane available as Silquest Y-9805 from GE Silicones.

In another embodiment of the disclosed methods, the silicon compound may comprise a polyalkylene oxide polysiloxane. The term 'polyalkylene oxide polysiloxane' as used herein refers to polyalkylene oxide polysiloxanes that contain a dialkyl polysiloxane hydrophobic moiety and one or more hydrophilic polyalkylene chains. The hydrophilic polyalkylene chains can be incorporated as side chains (pendant moieties) or as block copolymer moieties with the polysiloxane hydrophobic moiety.

Suitable polyalkylene oxide polysiloxanes may be described by the following general formulas IV and V:

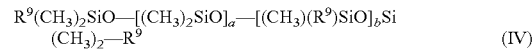 (IV)

wherein a+b are about 1 to about 50, or about 1 to about 30, or about 1 to about 25, and each R⁹ is the same or different and is a methyl or a poly(ethyleneoxide/propyleneoxide) copolymer group having the general formula:

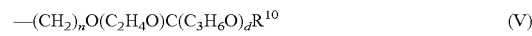 (V)

wherein at least one R⁹ is a poly(ethyleneoxy/propyleneoxy) copolymer group, and wherein n is 3 or 4; c (for all polyalkyleneoxy side groups) has a value of about 1 to about 100, or about 6 to about 100; c+d has a value of about 5 to about 150, or about 7 to about 100; and each $R^{10}$ is the same or different and is hydrogen, a $C_1$-$C_4$ alkyl, or an acetyl group. Each polyalkylene oxide polysiloxane has at least one $R^9$ group being a poly(ethyleneoxide/propyleneoxide) copolymer group.

Examples of these types of silicone compounds are the Silwet® surfactants that are available from Crompton. Representative Silwet® surfactants that contain only ethyleneoxy ($C_2H_4O$) groups include L-7608, L-7607, L-77, L-7605, L-7604, L-7600, L-7657, L-7602, L-7622, L-8600, L-8610, and L-8620.

Examples of Silwet® surfactants that contain both ethyleneoxy ($C_2H_4O$) and propyleneoxy ($C_3H_6O$) groups include L-720, L-7001, L-7002, L-7210, L-7200, and L-7220.

Examples of Silwet® surfactants which contain only propyleneoxy ($C_3H_6O$) groups include L7500, L7510, L7550, and L8500.

The molecular weight of the optional polyalkyleneoxy group ($R^9$) may be less than or equal to about 10,000. The suitable molecular weight of the polyalkylene oxide polysiloxane is dependent on the exact functionality in a given composition. If propyleneoxy groups are present in the polyalkylenoxy chain, they can be distributed randomly in the chain, or exist as blocks.

Other nonlimiting examples of polyalkylene oxide polysiloxanes include the following compounds available from Dow Corning® 193, 190, FF-400 Fluid, Q2-5220, Q4-3667, Q2-5211, as well as compounds available from Toray Dow Corning Silicone Co., Ltd. known as SH3771C, SH3772C, SH3773C, SH3746, SH3748, SH3749, SH8400, SF8410, and SH8700, KF351 (A), KF352 (A), KF354 (A), and KF615 (A) of Shin-Etsu Chemical Co., Ltd., TSF4440, TSF4445, TSF4446, TSF4452 of Toshiba Silicone Co.

In one embodiment, the silicon compound will comprise from about 0.01 percent by weight (wt %) to about 10 wt % of the total weight of the winter precipitation barrier composition. In another embodiment, the silicon compound comprises about 0.5 wt % to about 4 wt % of the total weight of the winter precipitation barrier composition. In one exemplary embodiment, the silicon compound comprises about 0.5 wt % to about 2 wt % of the total weight of the winter precipitation barrier composition.

In one embodiment, a reactive silane will comprise from 0 to 100 wt % of the silicon compound, based on the total weight of the silicon compound. In another embodiment, a polyalkylene oxide polysiloxane will comprise from 0 to 100 wt % of the silicon compound, based on the total weight of the silicon compound. In another embodiment, a reactive silane will comprise from 1 to 99 wt % of the silicon compound, and a polyalkylene oxide polysiloxane will comprise from 99 to 1 wt % of the silicon compound, based on the total weight of the silicon compound. In one exemplary embodiment of the disclosed winter barrier precipitation composition, a reactive silane as disclosed herein will comprise 100 wt % of the silicon compound, based on the total weight of the silicon compound.

The winter precipitation barrier composition will also comprise a solvent.

The solvent will generally be present in an amount of from 0 to 99.9% by weight, based on the total weight of the winter precipitation barrier composition. In another embodiment, the solvent will generally be present in an amount of from 10 to 90% by weight, based on the total weight of the winter precipitation barrier composition. In one exemplary embodiment, the solvent will generally be present in an amount of from 60 to 80% by weight, based on the total weight of the winter precipitation barrier composition.

Suitable solvents include those that are solvents for both the silicon compound and the optional auxiliary compound, discussed below. Illustrative examples of suitable solvents include, for example, water and monoalcohols such as methanol, ethanol, isopropanol, and combinations thereof. In one exemplary embodiment, the solvent will be a combination of water and a monoalcohol. In one embodiment, the monoalcohol will be methanol.

If a combination of water and a monoalcohol are used, water may be used in amounts of from 0 to 65% by weight, based on the total weight of the winter precipitation barrier composition, while the monoalcohol will be used in amounts of from 100 to 35% by weight, based on the total weight of the winter precipitation barrier composition. In one embodiment, water will generally be used in amounts of from 0 to 20% by weight, based on the total weight of the winter precipitation barrier composition, while the monoalcohol will be used in amounts of from 50 to 70% by weight, based on the total weight of the winter precipitation barrier composition. In one exemplary embodiment, water will generally be used in amounts of from 5 to 15% by weight, based on the total weight of the winter precipitation barrier composition, while the monoalcohol will be used in amounts of from 55 to 65% by weight, based on the total weight of the winter precipitation barrier composition.

In another embodiment, the winter precipitation barrier composition also optionally comprises an auxiliary component. The term 'auxiliary component' as used herein refers to compounds or materials that assist in the frost prevention effect of the silicon compound, especially the reactive silane as discussed above. The assistance of the auxiliary compound may be a synergistic effect with regards to the reactive silane or an additive effect such as that resulting from a material that lowers the freezing point of the overall winter precipitation barrier composition.

Illustrative examples of suitable optional auxiliary components include silicone oils, polyols such as glycols, fluorinated polyether diols, or a combination comprising one or more of the foregoing auxiliary compounds.

In one exemplary embodiment, the auxiliary component may be a low viscosity component having a viscosity of less than or equal to about 5000 centipoises. Illustrative examples of such low viscosity components include silicone oils and glycols.

The term "silicone oil" as used herein refers to a molecule with a—(SiO—)$_n$ backbone that completes its valency with methyl groups only.

Suitable glycols include, for example, ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, 1,6-pentylene glycol, neopentyl glycol, hexane diols, and the like, and combinations comprising one or more of the foregoing glycols.

Suitable fluorinated polyether diols may be prepared using oxetane chemistry and are commercially available from Omnova Solutions Inc. under the trade name PolyFox®, including PolyFox® 6320, 6520, 636, 656, and combinations comprising one or more of the foregoing fluorinated polyether diols.

In one embodiment, the optional auxiliary compound comprises about from about 0 wt % to about 50 wt % of the total weight of the winter precipitation barrier composition. In another embodiment, the auxiliary compound comprises about 1 wt % to about 40 wt % of the total weight of the winter precipitation barrier composition. In another embodiment, the auxiliary compound comprises about 25 wt % to about 35 wt % of the total weight of the winter precipitation barrier composition.

When the auxiliary compound is silicone oil, the silicone oil may, for example, comprise about 1 wt % to about 5 wt % of the total weight of the windshield treatment composition. When the auxiliary compound is a glycol, the glycol may, for example, comprise about 1 wt % to about 40 wt % of the total weight of the windshield treatment composition.

The winter precipitation barrier composition may further optionally comprise a humectant. The term 'humectant' as used herein refers to a material or compound that is hydroscopic and water-soluble and is less volatile than the reactive silane, the solvents, and/or any optional auxiliaries. In one embodiment, the humectant will be less volatile than any optional auxiliaries. It will be appreciated that in some cases, a compound may behave functionally as both a humectant and an optional auxiliary. In one exemplary embodiment, however, the disclosed barrier compositions will comprise a first compound that functions as a humectant and a second compound that functions as an auxiliary, wherein the first and second compounds are different.

Illustrative examples of suitable humectants include polyols such as polyalcohols. Suitable examples include glycerin, sorbitol, the like and combinations of such. In one exemplary embodiment, the humectant will be sorbitol.

Optional humectants may be used in amounts of from about 0 to 1% by weight, based on the total weight of the winter precipitation barrier composition. In another embodiment, humectants may be present in an amount of from 0.1 to 0.9% by weight, based on the total weight of the winter precipitation barrier composition. In one exemplary embodiment, humectants will be present in an amount of from 0.2 to 0.4% by weight, based on the total weight of the winter precipitation barrier composition.

The winter precipitation barrier composition may also comprise additional components such as buffering agents as well as inert components such as, for example, coloring agents such as dyes and pigments, and the like.

If desired, the pH of the windshield treatment composition may be adjusted. Without being held to theory, it is believed that the hydrolysis of reactive silanes, for example, is pH-dependent, with an optimal pH of about 3 to about 8. The windshield treatment compositions may have a pH of about 4 to about 6, or about 5.

The windshield treatment composition may thus optionally further comprise a buffering agent. Suitable buffering agents include, for example, organic and inorganic acids and bases, including salts thereof, such as mono- or poly-alkali metal, alkaline earth metal or amine salts of carbonic acid, phosphoric acid, sulfuric acid, hydrosulfuric acid, a $C_1$-$C_6$ organo-, mono- or poly-carboxylic acid, or a $C_2$-$C_{30}$ alkyleneiminopolycarboxylic acid, ammonia, a $C_1$-$C_{30}$ organic base, or a combination comprising one or more of the foregoing buffering agents. Exemplary buffering agents include sodium bicarbonate, sodium carbonate, ammonium hydroxide, ammonium carbonate, sodium borate, mono-, di-, or trisodium phosphate, mono-, di-, or tripotassium phosphate, ammonium sodium phosphate, mono-, or disodium sulfate, acetic acid, sodium acetate, potassium acetate, ammonium acetate, calcium acetate, sodium formate, mono-, or disodium sulfide, ammonia, mono-, di, or triethylamine, mono-, di-, or triethanolamine, (ethylenedinitrilo) tetraacetic acid sodium salt (sodium E.D.T.A.), pyridine, aniline, sodium silicate, and combinations comprising one or more of the foregoing buffering agents.

The disclosed winter precipitation barrier compositions may be prepared by admixture of the foregoing components according to known windshield composition preparation techniques. In one exemplary embodiment, the silicon-containing compound will be mixed with one or more monoalcohols before admixture with water.

The disclosed method of simultaneously preventing frost and facilitating removal of winter precipitation relative to a windshield comprises applying to a windshield the disclosed winter precipitation barrier compositions. The step of applying the disclosed winter precipitation barrier compositions may be done in any manner capable of providing a continuous film of the winter precipitation barrier on the windshield.

Illustrative examples of suitable application methods include spraying, rolling, wiping, pouring, and combinations thereof. Illustrative examples of spray applications include application via a trigger sprayer, a pressurized or aerosol sprayer, or the windshield washer reservoir of an automobile, for example. Application via rolling may be accomplished either manually or automatically with the use of a saturated roller such as is used for the application of coatings. Wiping can be accomplished either manually or automatically with simple cloths or papers. An example of a combination application would be with the windshield washer reservoir of an automobile in combination with the action of the windshield wipers.

After application, in one embodiment, the applied winter precipitation barrier will be free of additional movement or activity. That is, in one embodiment, the winter precipitation barrier will be applied after the vehicle is stopped and is at rest. In one exemplary embodiment, the winter precipitation barrier will be applied immediately prior to a period of time when frost is known to accumulate. For example, in one especially exemplary embodiment, the winter precipitation barrier will be applied when the vehicle is parked for the night or when the vehicle will be unused for several hours and is exposed to frost generating conditions.

In addition, the disclosed methods may be characterized by the lack of certain steps required by the prior art. In one embodiment, the disclosed methods do not require any pre-cleaning or pretreatment of the windshield. In another embodiment, the disclosed methods do not require the application of curing stimulus, including, but not limited to, elevated temperature and/or electromagnetic energy. In yet another embodiment, the disclosed methods are characterized by the lack of any post-application steps such as wiping, rinsing, buffing, cleaning, removal, or the like. It will be appreciated that the terms 'cleaning or removal' as used in the preceding sentence do not include any incidental removal of the applied winter precipitation barrier composition occurring as a result of the removal of winter precipitation. In one exemplary embodiment, the disclosed methods are characterized by the lack of any post-application treatments such as the application of additional coatings, waxes, or the like that are intended to bond to the applied winter precipitation barrier composition.

EXAMPLES

Examples 1-6

Windshield Treatment Compositions

In the following examples, the components were mixed in the amounts shown in Table 1. In examples 5 and 6, the pH was adjusted to about 5 by the addition of acetic acid. The compositions were sprayed onto an automobile windshield with a trigger sprayer and left overnight at ambient New England winter conditions, starting at about 20° F. and decreasing to about 0° F. overnight. On control windshields with no windshield treatment composition, a hard frost formed overnight. The frost on the windshields with the windshield treatment compositions was compared to an untreated control windshield.

TABLE 1

| Component | 1 | 2 | 3 | 4 | 5 | 6 |
|---|---|---|---|---|---|---|
| Silicon Compound: Silwet L-7608 siloxane polymer | 1 wt % | 1 wt % | | | | |
| Silicon Compound: Silwet L-77 siloxane polymer | | | 1 wt % | | | |
| Silicon compound: Silquest Y-9805 ethylene bridged bis-(triethoxy)silane | | | | 1 wt % | 2 wt % | |
| Silicon compound: methyltrimethoxy-silane | | | | | | 2 wt % |
| Auxiliary compound: Silicone oil | | | | | 3 wt % | 3 wt % |
| Solvent: Methanol | 99 wt % | | 99 wt % | 99 wt % | | |
| Solvent: Isopropanol | | 99 wt % | | | Balance | Balance |
| Solvent: water | | | | | 2 wt % | 2 wt % |
| Buffering agent: Acetic acid | | | | | To pH about 5 | To pH about 5 |
| Properties | | | | | | |
| Easy frost removal compared to control | X | X | X | X | X | X |
| Less frost on windshield than control | | | | | X | X |

As shown in the table, all of the windshields treated with the disclosed windshield treatment compositions exhibited easier frost removal than an untreated windshield. In addition, compositions 5 and 6 also exhibited less frost on the windshield than the control. Such compositions are particularly advantageous to reduce ice and frost on windshields and to provide easier ice and frost removal compared to untreated windshields.

Examples 7-8

Additional Windshield Treatment Compositions

Additional windshield treatment compositions comprising propylene glycol as the auxiliary compound were formed.

| Component | 7 | 8 | 9 |
|---|---|---|---|
| Silicon Compound: Silwet L-7608 siloxane polymer | 4 wt % | | |
| Silicon compound: Silquest Y-9805 ethylene bridged bis-(triethoxy)silane | | 4 wt % | |
| Silicon compound: methyltrimethoxy-silane | | | 4 wt % |
| Auxiliary compound: Propylene glycol | 30 wt % | 30 wt % | 30 wt % |
| Solvent: water | | 66 wt % | 66 wt % |
| Solvent: methanol | 66 wt % | | |
| Properties | | | |
| Easy frost removal compared to control | X | X | X |
| Less frost on windshield than control | X | X | X |

As shown in the table, all of the windshields treated with the disclosed windshield treatment compositions exhibited easier frost removal and less frost than an untreated windshield. Such compositions are particularly advantageous to reduce snow, ice and/or frost on windshields and to provide easier ice and frost removal compared to untreated windshields. The compositions may reduce the use of washer fluid and may also save time for consumers who may have to scrape ice from their windshields on cold mornings. The foregoing examples demonstrate that the use of the disclosed compositions and/or methods provide reductions in the degree of adhesion of any accumulated winter precipitation to a windshield. As a result, the use of the disclosed methods and/or compositions facilitate the removal of accumulated winter precipitation from a treated windshield. That is, it becomes easier to scrape, rinse, wipe, and/or brush the winter precipitation from a treated windshield.

All ranges disclosed herein are inclusive and combinable. The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A winter precipitation barrier composition consisting of, based on a total weight of the winter precipitation barrier composition:
   about 55 to about 99.9 percent by weight of a monoalcohol; and
   about 0.01 to about 10 percent by weight of a reactive silane,
   wherein the reactive silane is selected from the group consisting of:
   a halosilane having the formula (I):

$$X_n SiR_{4-n}^1 \tag{I}$$

wherein n is a number from 1 to 3, $R^1$ is a linear, branched or cyclic, substituted or unsubstituted $C_1$-$C_{30}$ alkyl, $C_2$-$C_{30}$ alkenyl, or $C_6$-$C_{36}$ aryl, alkaryl, or aralkyl group, and X is F, Cl, Br, or I;

an alkoxysilane or aminosilane having the formula (II):

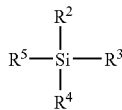
(II)

wherein the alkoxysilane or aminosilane comprises no Si—Si bonds; each $R^2$-$R^5$ can be the same or different; two or three of $R^2$-$R^5$ are of the formula $OR^6$ or $NR^7R^8$; the remaining $R^2$-$R^5$ are independently linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl groups that can optionally comprise heteroatoms that are not silicon; $R^6$ can be a linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl groups that can optionally comprise heteroatoms that are not silicon; and $R^7$ and $R^8$ can be the same or different and can be hydrogen or a linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl groups that can optionally comprise heteroatoms that are not silicon;

a compound having the formula (III):

(III)

wherein $R^6$ and $R^8$ are independently halogen or linear, branched or cyclic, substituted or unsubstituted, $C_1$-$C_{30}$ alkoxy groups and $R^7$ is a linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl group that can optionally comprise heteroatoms that are not silicon; and a combination thereof;

an auxiliary compound selected from the group consisting of silicone oils, fluorinated polyether diols, a combination of the foregoing auxiliary compounds, or a combination of the foregoing auxiliary compounds and glycols; and optionally an additional component selected from the group consisting of a humectant, a pH buffering agent, a coloring agent, a dye, a pigment and combinations thereof.

2. The winter precipitation barrier composition of claim 1, wherein the monoalcohol is selected from the group consisting of methanol, ethanol, isopropanol, and a combination thereof.

3. The winter precipitation barrier composition of claim 1, wherein the auxiliary compound is the silicone oil, present in an amount of about 1 to about 5 percent by weight, based on the total weight of the winter precipitation barrier composition.

4. The winter precipitation barrier composition of claim 1, wherein the auxiliary compound is the glycol, present in an amount of about 1 to about 40 percent by weight, based on the total weight of the winter precipitation barrier composition.

5. The winter precipitation barrier composition of claim 4, wherein the glycol is selected from the group consisting of ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, neopentyl glycol, hexane diol, and a combination thereof.

6. The winter precipitation barrier composition of claim 4, wherein the glycol is selected from the group consisting of ethylene glycol, 1,2-propylene glycol, 1,3-propylene glycol, and a combination thereof.

7. The winter precipitation barrier composition of claim 1, wherein the pH is about 3 to about 8.

8. A method of preventing frost and facilitating removal of winter precipitation relative to a windshield, comprising applying the winter precipitation barrier composition of claim 1 to a windshield.

9. A method of preventing frost and facilitating removal of winter precipitation relative to a windshield, comprising applying a winter precipitation barrier composition to a windshield wherein the winter precipitation barrier composition consists of, based on a total weight of the winter precipitation barrier composition:

about 60 to about 90 percent by weight water;
about 1 to about 35 percent by weight of a glycol; and
about 0.01 to about 10 percent by weight of a reactive silane,
wherein the reactive silane is selected from the group consisting of:
a halosilane having the formula (I):

(I)

wherein n is a number from 1 to 3, $R^1$ is a linear, branched or cyclic, substituted or unsubstituted $C_1$-$C_{30}$ alkyl, $C_2$-$C_{30}$ alkenyl, or $C_6$-$C_{36}$ aryl, alkaryl, or aralkyl group, and X is F, Cl, Br, or I;

an alkoxysilane or aminosilane having the formula (II):

(II)

wherein the alkoxysilane or aminosilane comprises no Si-Si bonds; each $R^2$-$R^5$ can be the same or different; at least two of $R^2$-$R^5$ are of the formula $OR^6$ or $NR^7R^8$; the remaining $R^2$-$R^5$ are independently linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl groups that can optionally comprise heteroatoms that are not silicon; $R^6$ can be a linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl groups that can optionally comprise heteroatoms that are not silicon; and $R^7$ and $R^8$ can be the same or different and can be hydrogen or a linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl groups that can optionally comprise heteroatoms that are not silicon;

a compound having the formula (III):

(III)

wherein $R^6$ and $R^8$ are independently halogen or linear, branched or cyclic, substituted or unsubstituted, $C_1$-$C_{30}$ alkoxy groups and $R^7$ is a linear, branched, or cyclic, substituted or unsubstituted $C_1$-$C_{30}$ alkyl, $C_2$-$C_{30}$ alkenyl, or $C_6$-$C_{36}$ aryl, alkaryl, or aralkyl group that can optionally comprise heteroatoms that are not silicon; and a combination thereof, an auxiliary compound selected from the group consisting of silicone oil, fluorinated polyether diol, a combination of the foregoing auxiliary compounds, and optionally an additional component selected from the group consisting of a pH buffering agent, glycerin, sorbitol, or a combination thereof.

* * * * *